United States Patent
Chen et al.

(10) Patent No.: US 12,189,991 B2
(45) Date of Patent: Jan. 7, 2025

(54) STORAGE DEVICE CONTROLLER AND METHOD CAPABLE OF ALLOWING INCOMING OUT-OF-SEQUENCE WRITE COMMAND SIGNALS

(71) Applicant: Silicon Motion, Inc., Hsinchu County (TW)

(72) Inventors: Li-Chi Chen, Taichung (TW); Yen-Yu Jou, Taoyuan (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/958,430

(22) Filed: Oct. 2, 2022

(65) Prior Publication Data
US 2024/0111456 A1    Apr. 4, 2024

(51) Int. Cl.
*G06F 3/06* (2006.01)
(52) U.S. Cl.
CPC .......... *G06F 3/0659* (2013.01); *G06F 3/0604* (2013.01); *G06F 3/0673* (2013.01)
(58) Field of Classification Search
CPC .... G06F 3/0659; G06F 3/0604; G06F 3/0673; G06F 3/0658; G06F 3/0655; G06F 13/1668
See application file for complete search history.

(56) References Cited

U.S. PATENT DOCUMENTS

| | | | |
|---|---|---|---|
| 9,363,209 B1 | 6/2016 | Akins, III | |
| 11,586,385 B1 * | 2/2023 | Lercari | G06F 12/0246 |
| 2017/0109096 A1 | 4/2017 | Jean | |
| 2018/0293006 A1 * | 10/2018 | Jeong | G06F 3/0605 |
| 2019/0391755 A1 * | 12/2019 | Lee | G06F 3/0679 |
| 2020/0409589 A1 * | 12/2020 | Bennett | G06F 3/0616 |
| 2021/0081330 A1 * | 3/2021 | Bennett | G06F 3/0673 |
| 2021/0191854 A1 * | 6/2021 | Yang | G06F 12/0246 |
| 2021/0318829 A1 * | 10/2021 | Vlasov | G06F 9/505 |
| 2022/0171569 A1 * | 6/2022 | Um | G06F 3/0688 |
| 2023/0065300 A1 * | 3/2023 | Labat | G06F 3/0604 |
| 2023/0168827 A1 * | 6/2023 | Lee | G06F 3/0659 |
| | | | 711/154 |
| 2023/0305714 A1 * | 9/2023 | Lee, II | G06F 3/0688 |

FOREIGN PATENT DOCUMENTS

| | | |
|---|---|---|
| CN | 110647475 A | 1/2020 |
| CN | 113179658 A | 7/2021 |
| CN | 113454612 A | 9/2021 |
| CN | 114217859 A | 3/2022 |
| CN | 114253483 A | 3/2022 |
| TW | 200928731 | 7/2009 |
| TW | 201824000 A | 7/2018 |

OTHER PUBLICATIONS

Tallis, Billy, "The Next Step in SSD Evolution: NVMe Zones Namespaces Explained" 2020, https://www.anandtech.com/show/15959/nvme-zoned-namespaces-explained.*

* cited by examiner

*Primary Examiner* — Tracy A Warren
(74) *Attorney, Agent, or Firm* — Winston Hsu

(57) ABSTRACT

A method of a storage device controller includes: using an interface circuit for receiving and storing different write address information of different write command signals sent from a host device, the different write address information being out of sequence; and, using multiple processor cores to rearrange the different write address information in sequence and then write data into at least one storage zone according to the different write address information rearranged in sequence.

16 Claims, 8 Drawing Sheets

STORAGE DEVICE CONTROLLER AND METHOD CAPABLE OF ALLOWING INCOMING OUT-OF-SEQUENCE WRITE COMMAND SIGNALS

BACKGROUND OF THE INVENTION

1. Field of the Invention

The invention relates to a multiple processing mechanism, and more particularly to a storage device controller and corresponding method.

2. Description of the Prior Art

Generally speaking, a conventional flash memory controller may be used as a controller applied into a host device such as a storage server which may be connected to one or more storage devices such as solid-state drives/devices. A namespace is a collection of logical block addresses (LBAs) accessible to the software of the host device, and it may be divided into a plurality of zones which may be required to be sequentially written, and the logical block addresses of the same zone may be also required to be sequentially written. The conventional flash memory controller can merely support the queue depth being equal to one, and multiple zones cannot be simultaneously written by the conventional flash memory controller. The response time of a large data amount will be longer.

SUMMARY OF THE INVENTION

Therefore one of the objectives of the invention is to provide a storage device controller and a corresponding method, to solve the above-mentioned problems.

According to embodiments of the invention, a storage device controller is disclosed. The storage device controller comprises an interface circuit and multiple processor cores. The interface circuit is coupled to a host device which is externally coupled to the storage device controller, and is used for receiving and storing different write address information of different write command signals sent from the host device, wherein the different write address information are out of sequence. The multiple processor cores are coupled to the interface circuit, and used for rearranging the different write address information in sequence and then writing data into at least one storage zone according to the different write address information rearranged in sequence.

According to the embodiments, a method of a storage device controller is disclosed. The method comprises: using an interface circuit for receiving and storing different write address information of different write command signals sent from a host device, the different write address information being out of sequence; and, using multiple processor cores to rearrange the different write address information in sequence and then write data into at least one storage zone according to the different write address information rearranged in sequence.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution and a storage device controller capable of arranging or rearranging a host device's write command signals that are out of sequence (not in order) to meet the requirement of the NVMe (NVM Express) zoned namespaces (ZNS) interface wherein NVM stands for Non-Volatile Memory. A namespace is a collection of logical block addresses (LBAs) accessible to the software of the host device. An NVMe namespace is divided into a plurality of zones which may be required to be sequentially written, and the logical block addresses of the same zone may be also required to be sequentially written. The provided storage device controller is to be coupled between the host device and one or more storage devices such as flash memory-based SSDs (solid-state drives/disks), and it can arrange or rearrange the host device's write command signals that are out of sequence to meet the sequential write requirements of the zoned namespace(s).

Figure 1:
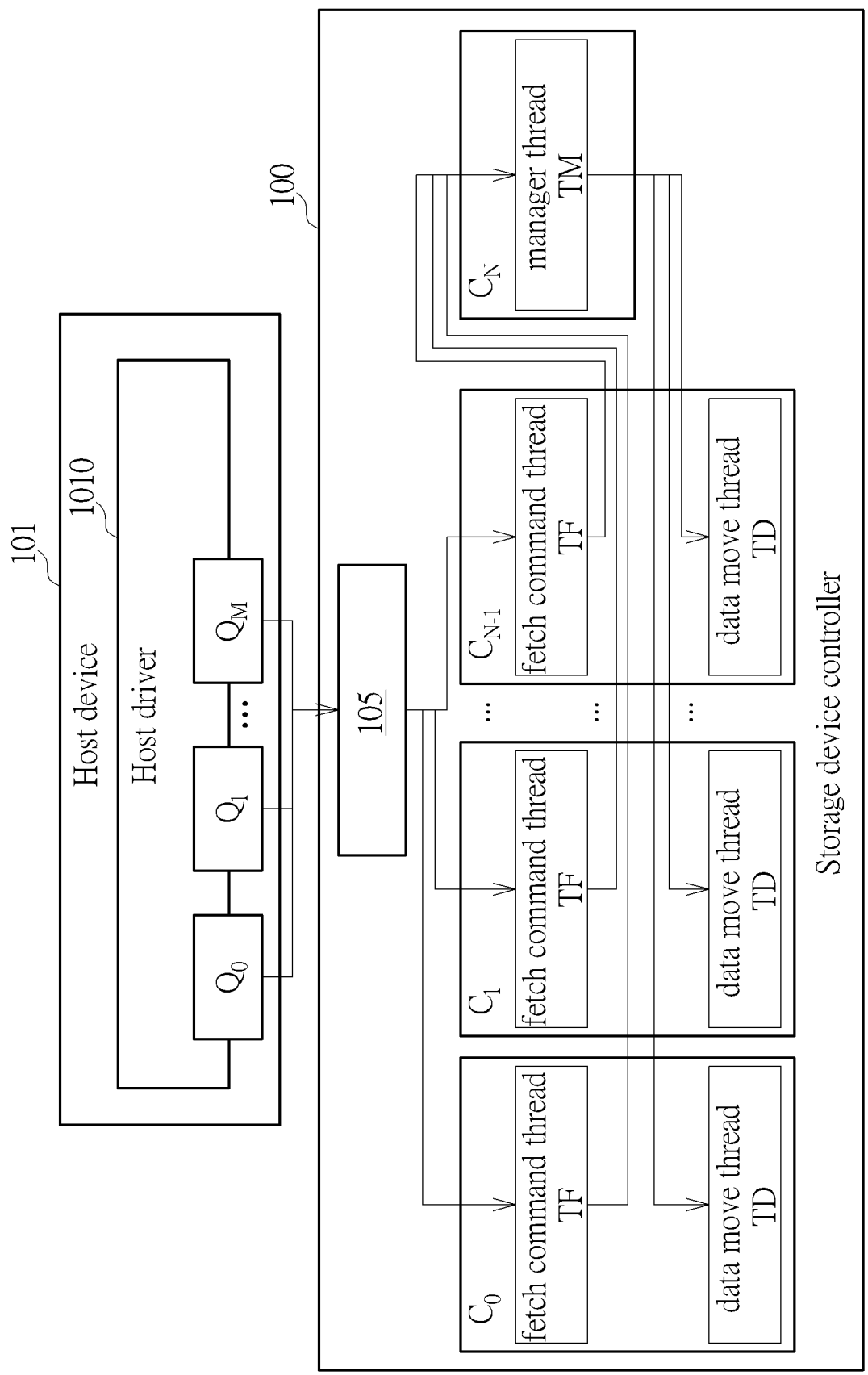
FIG. 1 is a block diagram of a storage device controller according to an embodiment of the invention.

FIG. 1 is a block diagram of a storage device controller 100 according to an embodiment of the invention. The storage device controller 100 is a multi-core flash memory processor (but not limited) which at least comprises multiple processor cores $C_0$, $C_1$, $C_{N-1}$, and $C_N$, and a specific interface circuit 105 such as an NVM Express (NVMe) hardware circuit, wherein the NVMe hardware circuit 105 supports NVMe protocol communication between a host device 101 and the storage device controller 100; the number N is not intended to be a limitation. The storage device controller 100 is externally coupled to the host device 101 such as a personal computer device or a server device and externally coupled to one or more storage devices such as flash memory-based SSDs (not shown in FIG. 1).

A processor core such as $C_N$ among the multiple cores $C_0$, $C_1$, $C_{N-1}$, and $C_N$ is dedicated and selected as an administrator core (or referred to as a manager core for all storage zones (which can be called as zones or open zones)) which has a manager thread such as a host-based flash translation layer (abbreviated as HBFTL in the following paragraphs) thread and is arranged to execute such HBFTL thread wherein a thread is an execution thread which can be executed by a processor or a processor core to perform a specific operation/function. The other processor cores $C_0$, and $C_{N-1}$ are regarded as worker cores, and each worker core has a first thread such as a fetch command thread TF and a second thread such as a data move thread TD.

The host device 101 may comprise a host driver 1010 which may have multiple I/O queues $Q_0$, $Q_1$ ... and $Q_M$ which are respectively coupled to the NVMe hardware circuit 105 through the NVMe interface protocol. The number M can be identical to or different from the number N. Each of the I/O queues $Q_0$, $Q_1$, ..., and $Q_M$ can be used to store information of a single write command signal which may carry the write command, one set of corresponding write address information, and corresponding data unit(s) to be written, wherein the corresponding write address information may comprise a start logical block address (abbreviated as SLBA) and a data length of the corresponding data unit(s) such as a number of logical block address(es) (abbreviated as NLBA). Further, the queue depth of each I/O queues $Q_0$, $Q_1$, ..., and $Q_M$ may be equal to one (but not limited); that is, each I/O queue can merely store one single set of write address information. In this embodiment, the queue depth of each I/O queues $Q_0$, $Q_1$, and $Q_M$ can be configured to be larger than one since the storage device controller 100 can allow the out-of-sequence write command signals.

When the host device 101 issues multiple write command signals to write different data units into consecutive storage spaces of the same open zone or different open zones, the storage device controller 100 can allow that the write address information of the write command signals are out of order (or out of sequence). The host device 101 for example may issue and transmit the different write command signals into at least one portion of the different I/O queues $Q_0$, $Q_1$, ..., and $Q_M$, and the I/O queues $Q_0$, $Q_1$, ..., and $Q_M$ may sequentially or randomly output the different write address information of the write command signals into the NVMe hardware circuit 105; in the embodiments, for example (but not limited), the SLBA information of the write command signals received by the storage device controller 100 may be out of sequence, and the storage device controller 100 can still correctly service the write command signals to meet the sequential write requirements of the zoned namespace(s).

The different corresponding write address information of the different write command signals, stored in the I/O queues, are respectively transmitted from the I/O queues to the NVMe hardware circuit 105, and the transmissions may be sequential or may be out of order. That is, the NVMe hardware circuit 105 may simultaneously buffer one or more sets of write address information of write command signals.

When a worker core such as $C_0$ is idle, the worker core $C_0$ is arranged to execute its first thread, i.e. the fetch command thread TF, to fetch one set of write command information of one write command signal from the NVMe hardware circuit 105, and then is arranged to transmit the set of write command information to the manager core $C_N$. Similarly, when multiple or all worker cores $C_0, C_1, \ldots, C_{N-1}$ are idle, a portion of worker cores $C_0, C_1, \ldots, C_{N-1}$ respectively execute their fetch command threads TF to respectively fetch different sets of write address information of write command signals from the NVMe hardware circuit 105. Then, the worker cores respectively transmit their fetched different write address information to the manager core $C_N$.

The manager core $C_N$ is used to arrange or rearrange the order of write command signals if the different write address information of the received write command signals are out of order; the manager core $C_N$ does not rearrange the order of the write command signals if the different write address information of the write command signals are not out of order. Then, the manager core $C_N$ is used to sequentially transmit the rearranged different write address information respectively to the idle worker cores.

For example, for a worker core such as $C_0$, the worker core $C_0$ is arranged to execute its second thread, i.e. a data move thread TD, to move and write corresponding data based on a rearranged write address information into a storage space specified by the rearranged write address information. That is, for the worker core $C_0$, the write address information fetched by its first thread may be different from that assigned by the manager core $C_N$ and received by its second thread. Alternatively, in one example, for another different worker core such as $C_1$, the write address information fetched by its first thread may be identical to that received by its second thread and assigned by the manager core $C_N$.

Figure 2:
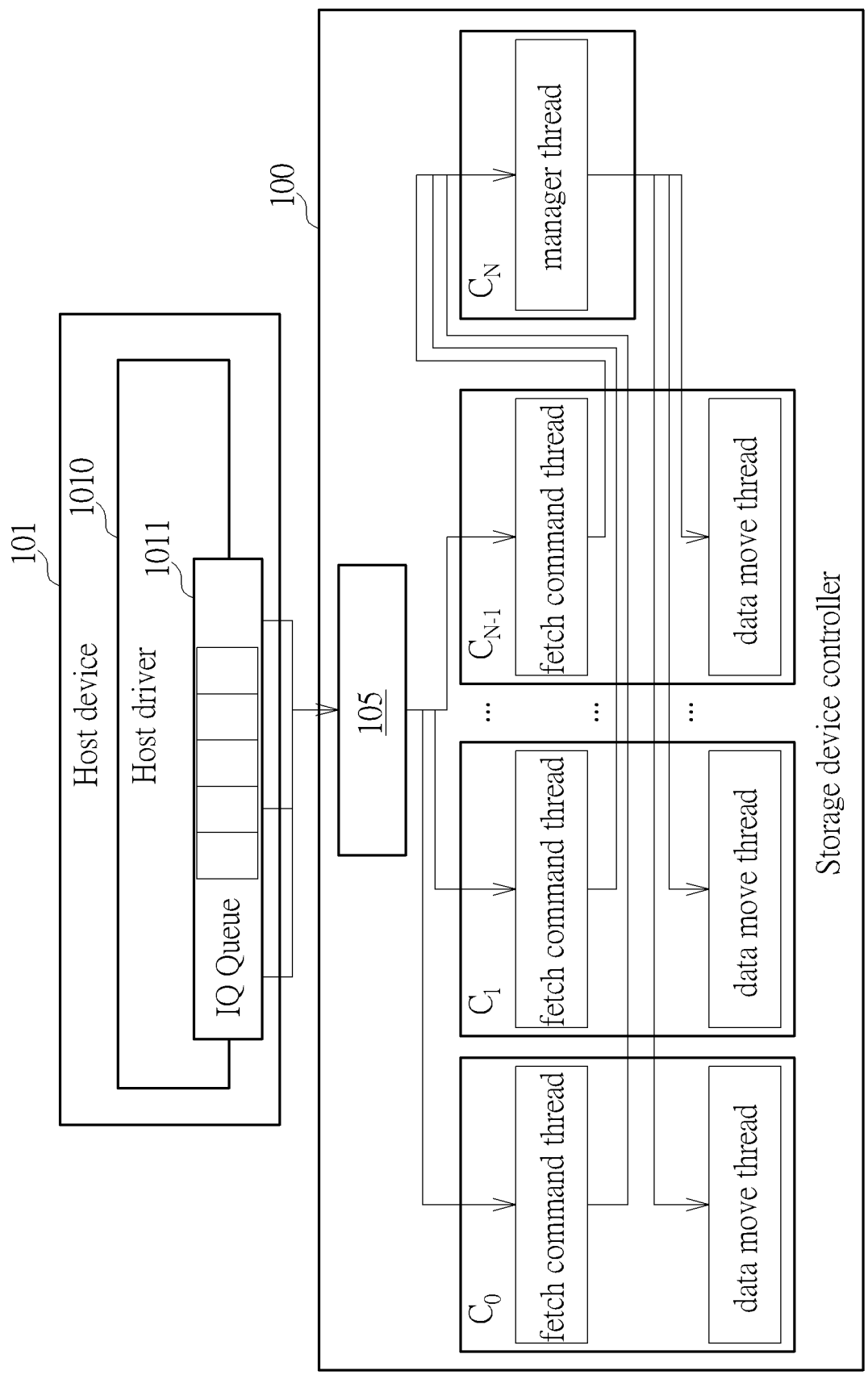
FIG. 2 is a block diagram of the storage device controller according to another embodiment of the invention.

FIG. 2 is a block diagram of the storage device controller 100 according to another embodiment of the invention. In this embodiment, the storage device controller 100 can support a different example of the host device 101 which may comprise a single I/O queue 1011 which can store multiple sets of different write address information. The operations and functions of the storage device controller 100 are identical to those of the storage device controller 100 in FIG. 1 and are not detailed for brevity.

Figure 3:
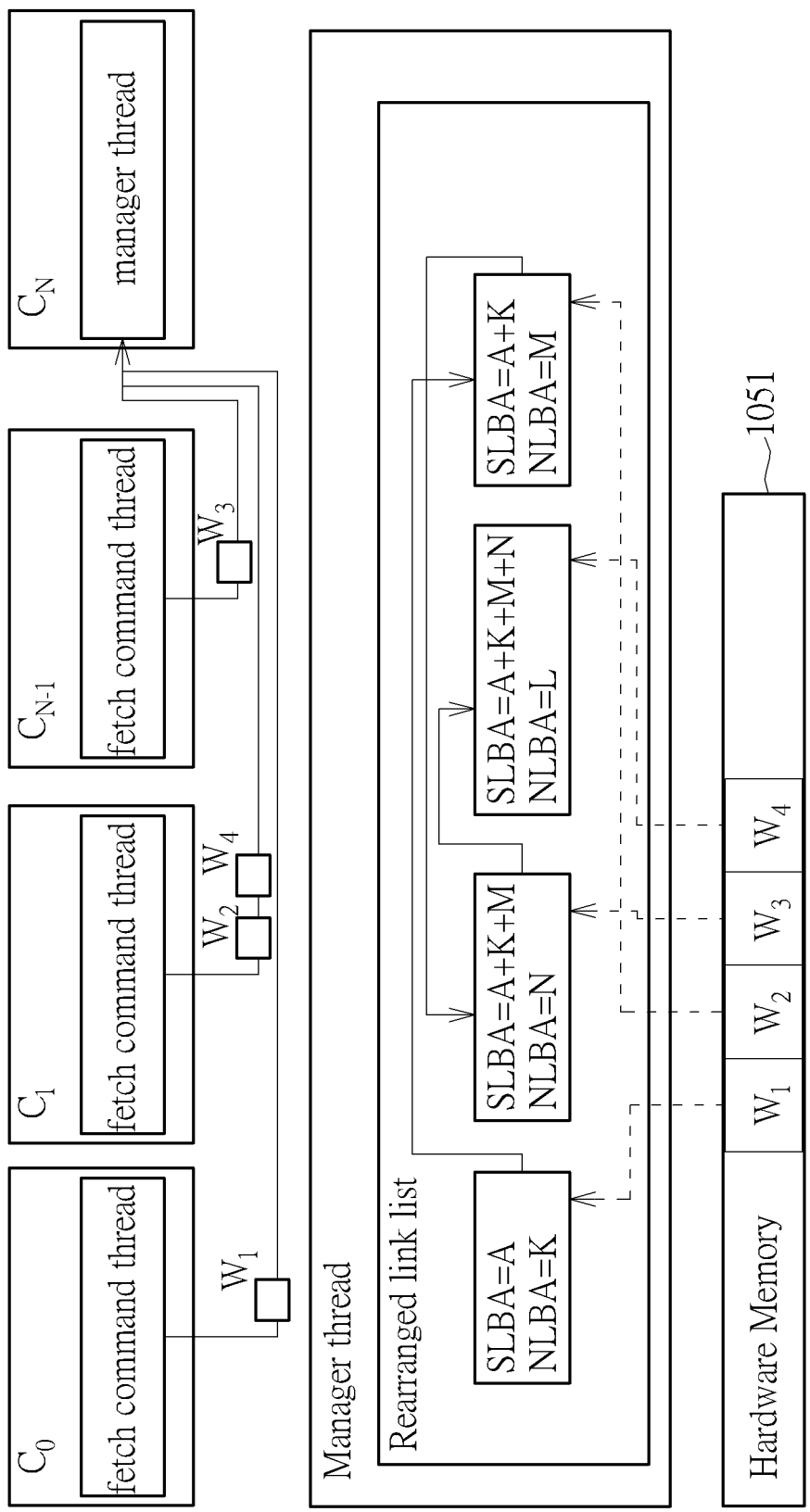
FIG. 3 is a diagram showing an example of the operations of the storage device controller in FIG. 1 according to an embodiment of the invention.

FIG. 3 is a diagram showing an example of the operations of the storage device controller 100 in FIG. 1 according to an embodiment of the invention. In FIG. 3, for example (but not limited), four consecutive write command signals may be sequentially transmitted from the host device 101 into the NVMe hardware circuit 105 in FIG. 1, and the different write address information, received by the storage device controller 100, may be not out of order. A hardware memory 1051 within the NVMe hardware circuit 105 may store the four write command signals $W_1$, $W_2$, $W_3$, and $W_4$ which carry four sets of different write address information, e.g. SLBA and NLBA information, which may be not out of order.

For example (but not limited), the worker core $C_0$ executes its fetch command thread TF to fetch the write address information (e.g. SLBA=A and NLBA=K) of the write command signal $W_1$ from the NVMe hardware circuit 105, wherein SLBA=A means that the start logical block address is equal to A and NLBA=K means that the number of logical block addresses is equal to K; that is, the end logical block address of the write command signal $W_1$ is equal to or calculated as (A+K). Then, the worker core $C_0$ executes its fetch command thread TF to transfer the write address information (e.g. SLBA=A and NLBA=K) of the write command signal $W_1$ into the HBFTL thread of the manager core $C_N$. It should be noted that, in one example, during a data write operation/procedure associated with multiple write command signals, if an operation of a write command signal has been completed or finished, then the HBFTL thread of the manager core $C_N$ may record an end logical block address of the write command signal at its zone write pointer. In addition, the write command signal $W_1$ is a first command signal received by the HBFTL thread of the manager core $C_N$, and the HBFTL thread is arranged to establish a link list and record the write address information (e.g. SLBA=A and NLBA=K) of write command signal $W_1$ at a first node of the link list.

Then, similarly, the worker core $C_1$ may execute its fetch command thread TF to fetch the write address information (e.g. SLBA=A+K+M and NLBA=N) of the write command signal $W_2$ from the NVMe hardware circuit 105, wherein SLBA=A+K+M means that the start logical block address is equal to (A+K+M) and NLBA=N means that the number of logical block addresses is equal to N; that is, the end logical block address of the write command signal $W_2$ is equal to or calculated as (A+K+M+N). Also, the worker core $C_1$ executes its fetch command thread TF to transfer the write address information (e.g. SLBA=A+K+M and NLBA=N) of the write command signal $W_2$ into the HBFTL thread of the manager core $C_N$.

After receiving the write address information (e.g. SLBA=A+K+M and NLBA=N) of the write command signal $W_2$, the HBFTL thread of the manager core $C_N$ is arranged to compare the SLBA of the last node of the link list, i.e. the SLBA (i.e. A) of first write command signal $W_1$, with the SLBA (i.e. A+K+M) of write command signal $W_2$ to determine how to update the link list. In this example, the SLBA (i.e. A+K+M) of write command signal $W_2$ is larger than the SLBA (i.e. A) of write command signal $W_1$, and the HBFTL thread is arranged to record the information of the second write command $W_2$ at a second node of the link list, wherein the second node is a next node following the first node. Similarly, during the data write operation/procedure associated with multiple write command signals, if an operation of the write command signal $W_1$ has been completed or finished, then the HBFTL thread of the manager core $C_N$ may record an end logical block address A of the write command signal $W_1$ at its zone write pointer. In this situation, the HBFTL thread of the manager core $C_N$ may compare the information of the zone write pointer with the SLBA of second write command signal $W_2$ to determine whether to load data from the host device 101 to the storage device controller 100 by using a direct memory access (DMA) operation. For example (but not limited), when the information of the zone write pointer is equal to the SLBA of one write command, the DMA operation may be executed to load data. In this example, since the information of the zone write pointer is not equal to the SLBA (i.e. A+K+M) of the write command signal $W_2$, the DMA operation is not performed.

Then, similarly, the worker core $C_{N-1}$ may execute its fetch command thread TF to fetch the write address information (e.g. SLBA=A+K+M+N and NLBA=L) of the write command signal $W_3$ from the NVMe hardware circuit 105, wherein SLBA=A+K+M+N means that the start logical block address is equal to (A+K+M+N) and NLBA=L means that the number of logical block addresses is equal to L; that is, the end logical block address of the write command signal $W_3$ is equal to or calculated as (A+K+M+N+L). Also, the worker core $C_{N-1}$ executes its fetch command thread TF to transfer the write address information (e.g. SLBA=A+K+M+N and NLBA=L) of the write command signal $W_3$ into the HBFTL thread of the manager core $C_N$.

After receiving the write address information (e.g. SLBA=A+K+M+N and NLBA=L), the HBFTL thread of the manager core $C_N$ is arranged to compare the SLBA of the last node of the link list, i.e. the SLBA (A+K+M) of the second write command signal $W_2$ with the SLBA (i.e. A+K+M+N) of write command signal $W_3$ to determine how to generate or update the link list. In this example, the SLBA (i.e. A+K+M+N) of write command signal $W_3$ is larger than the SLBA (i.e. A+K+M) of write command signal $W_2$, and the HBFTL thread is arranged to record the information of the third write command signal $W_3$ at the link list's third node which follows the information of the second write command $W_2$ at the second node of the link list, wherein the third node is now the last node in the link list.

Similarly, during the data write operation/procedure associated with multiple write command signals, if an operation of the write command signal $W_2$ has been completed or finished, then the HBFTL thread of the manager core $C_N$ may record an end logical block address (A+K+M+N) of the write command signal $W_2$ at its zone write pointer. In this situation, the HBFTL thread may compare the information of the zone write pointer with the SLBA of third write command signal $W_3$ to determine whether to load data from the host device 101 to the storage device controller 100 by using the DMA operation. For example (but not limited), if the information of the zone write pointer is equal to the SLBA of the third write command signal $W_3$, the DMA operation can be executed to load data. If the information of the zone write pointer is not equal to the SLBA of the write command signal $W_3$, the DMA operation is not performed.

Then, similarly, the worker core $C_1$ (but not limited) may execute its fetch command thread TF to fetch the write address information (e.g. SLBA=A+K and NLBA=M) of the write command signal $W_4$ from the NVMe hardware circuit 105, wherein SLBA=A+K means that the start logical block address is equal to (A+K) and NLBA=M means that the number of logical block addresses is equal to M; that is, the end logical block address of the write command signal $W_4$ is equal to or calculated as (A+K+M). Also, the worker core $C_1$ executes its fetch command thread TF to transfer the write address information (e.g. SLBA=A+K and NLBA=M) of the write command signal $W_4$ into the HBFTL thread of the manager core $C_N$.

After receiving the write address information (e.g. SLBA=A+K and NLBA=M), the HBFTL thread of the manager core $C_N$ is arranged to compare the SLBA of the last node of the link list, i.e. the SLBA (A+K+M+N) of the third write command signal $W_3$, with the SLBA (i.e. A+K) of write command signal $W_4$ to determine how to update the link list. In this example, the SLBA (i.e. A+K) of write command signal $W_4$ is smaller than the SLBA (i.e. A+K+M+N) of the last node of the link list, and the HBFTL thread is arranged to insert a new node between two nodes of the link list. For example (but not limited), the HBFTL thread inserts a new node between the node of write command signal $W_1$ and the node of write command signal $W_2$ to rearrange the order of the link list, wherein the new node records the write address information of write command signal $W_4$, i.e. the information of SLBA=A+K and NLBA=M. Thus, the updated link list comprises four nodes in which a first node recording the address information of write command signal $W_1$ is followed by a second node recording the address information of write command signal $W_4$ which is followed by a third node recording the address information of write command $W_2$ which is followed by a fourth node (i.e. the last node) recording the address information of write command $W_3$.

Further, similarly, during the data write operation/procedure associated with multiple write command signals, if an operation of one write command signal has been completed or finished, then the HBFTL thread of the manager core $C_N$ may record an end logical block address of the write command signal at its zone write pointer. In this situation, the HBFTL thread may compare the information of the zone write pointer with the SLBA of third write command signal $W_4$ to determine whether to load data from the host device 101 to the storage device controller 100 by using the DMA operation. For example (but not limited), if the information of the zone write pointer is equal to the SLBA of the third write command signal $W_4$, the DMA operation can be executed to load data. If the information of the zone write pointer is not equal to the SLBA of the write command signal $W_4$, the DMA operation is not performed.

Then, the manager core $C_N$ execute its HBFTL thread to sequentially assign and transmit the write address information recorded at the different nodes of the link list to idle worker core (s) of the different worker cores in order. For example, the executed HBFTL thread is arranged for assigning and transmitting the information of SLBA and NLBA of the write command signal $W_1$ at the first node of the link list to the data move thread TD of the worker core $C_0$, and the worker core $C_0$ executes its data move thread TD to move and write the data units to be written by the write command signal $W_1$ from the host device 101 into the storage block (s) of one or more SSDs, specified by the SLBA and NLBA of the write command signal $W_1$. In this example, the fetch command thread TF and data move thread TD of the worker core $C_0$ process or service the same write command signal $W_1$.

When the operation of write command signal $W_1$ is finished or is ready to be finished, the HBFTL thread of manager core $C_N$ is arranged for assigning and transmitting the information of SLBA and NLBA of the write command signal $W_4$ at the second node of the link list to the data move thread TD of the worker core $C_1$, and the worker core $C_1$ executes its data move thread TD to move and write the data units to be written by the write command signal $W_4$ from the host device 101 into the different storage block(s) of one or more SSDs, specified by the SLBA and NLBA of the write command signal $W_4$. In this example, the fetch command thread TF of the worker core $C_1$ services the write command signal $W_2$, and the data move thread TD of the worker core $C_1$ services the write command signal $W_4$ different from the write command signal $W_2$.

Then, when the operation of write command signal $W_4$ is or is to be finished, the HBFTL thread of manager core $C_N$ is arranged for assigning and transmitting the information of SLBA and NLBA of the write command signal $W_2$ at the third node of the link list to the data move thread TD of the worker core $C_{N-1}$, and the worker core $C_{N-1}$ executes its data move thread TD to move and write the data units to be written by the write command signal $W_2$ from the host device 101 into the different storage block (s) of one or more SSDs, specified by the SLBA and NLBA of the write command signal $W_2$. In this example, the fetch command thread TF of the worker core $C_{N-1}$ services the write command signal $W_3$, and the data move thread TD of the worker core $C_{N-1}$ services the write command signal $W_2$ different from the write command signal $W_3$.

Then, when the operation of write command signal $W_2$ is finished, the HBFTL thread of manager core $C_N$ is arranged for assigning and transmitting the information of SLBA and NLBA of the write command signal $W_3$ at the last node of the link list to the data move thread TD of an idle worker core such as $C_0$, $C_1$, or $C_{N-1}$, and for example the worker core $C_1$ (but not limited) is idle while the worker core $C_0$ and $C_{N-1}$ are busy, and the worker core $C_1$ may execute its data move thread TD to move and write the data units to be written by the write command signal $W_3$ from the host device 101 into the different storage block(s) of one or more SSDs, specified by the SLBA and NLBA of the write command signal $W_3$.

It should be noted that, in one embodiment, based on the generated link list, the HBFTL thread of the manager core $C_N$ can correspondingly and sequentially assign and transmit the address information recorded at the different nodes of the link list to a single one idle worker core, multiple different idle worker cores, or different idle worker core(s) which are different from the worker cores $C_0$, $C_1$, and $C_{N-1}$. Further, in one embodiment, the idle worker cores, selected by the manager core $C_N$, may be out of order while the operation of sequentially assign and transmit the information recorded at the different nodes of the link list is in order. Further, a worker core after executing the fetch command thread TF to service a write command signal may be arranged to execute other threads to service other operations or requests and thus become busy, and a different idle worker core is assigned by the manager core $C_N$ to execute the data move thread TD to service such write command signal. By doing so, even the address information of the sequentially received write command signals are out of sequence, the storage device controller 100 can still meet the sequential write requirements of the zoned namespace(s).

Figure 4:
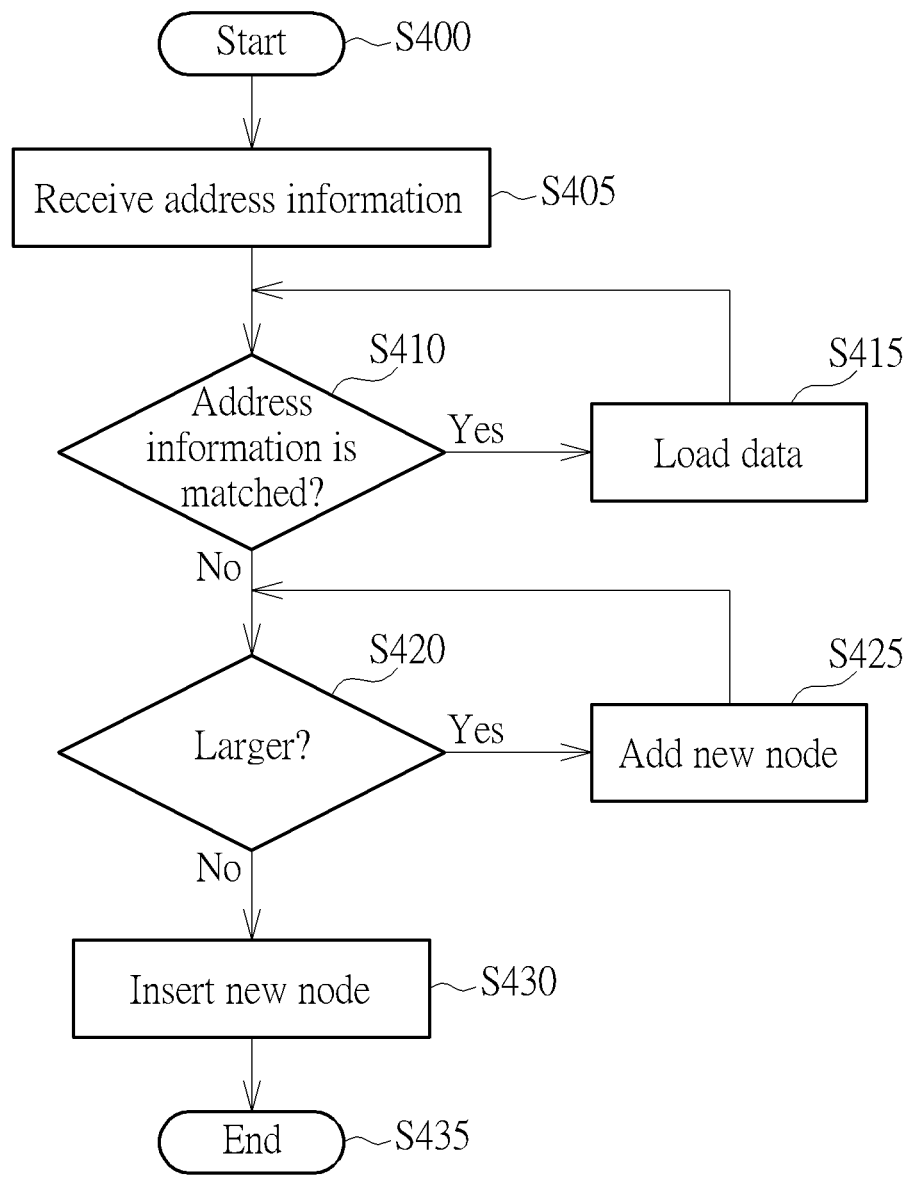
FIG. 4 is a diagram showing a flow of the operations of the manager core $C_N$ executing its HBFTL thread in FIG. 1 according to an embodiment of the invention.

FIG. 4 is a diagram showing a flow of the operations of the manager core $C_N$ executing its HBFTL thread in FIG. 1 according to an embodiment of the invention. Provided that substantially the same result is achieved, the steps of the flowchart shown in FIG. 4 need not be in the exact order shown and need not be contiguous, that is, other steps can be intermediate. Steps are detailed in the following:

Step S400: Start;

Step S405: HBFTL thread receives the information of SLBA and NLBA of a write command signal;

Step S410: HBFTL thread compares the information of the SLBA and NLBA of the write command signal with the information of a zone write pointer to determine whether to execute a DMA operation; if the information is matched or equal, the flow proceeds Step S415, otherwise, the flow proceeds Step S420;

Step S415: a direct memory access (DMA) operation is triggered and executed to load data;

Step S420: HBFTL thread compares the SLBA of the write command signal with the SLBA information at the last node of the link list; if the SLBA of the write command signal is larger than the SLBA information at the last node of the link list, the flow proceeds Step S425, otherwise, the flow proceeds Step S430;

Step S425: HBFTL thread adds a new node as a last node of the link list to record the address information of the received write command signal at the new node (i.e. the last node of the updated link list);

Step S430: HBFTL thread inserts a new node between two nodes of the link list to update the link list to record the address information of the received write command signal at the inserted node (i.e. it is not the last node of the updated link list); and Step S435: End.

Further, in another embodiment, in addition to the operations in the embodiments of FIG. 1 or FIG. 2, the HBFTL thread of the manager core $C_N$ may further assign or configure different worker cores as manager cores respectively dedicated for different open zones, and the loading of the processor core $C_N$ can be shared by the other processor cores which are originally used as worker cores. That is, the capability of the manager core $C_N$ can be shared into the different worker cores. The write operations in the different open zones can be isolated and individual, and the response time can be shorter.

Figure 5:
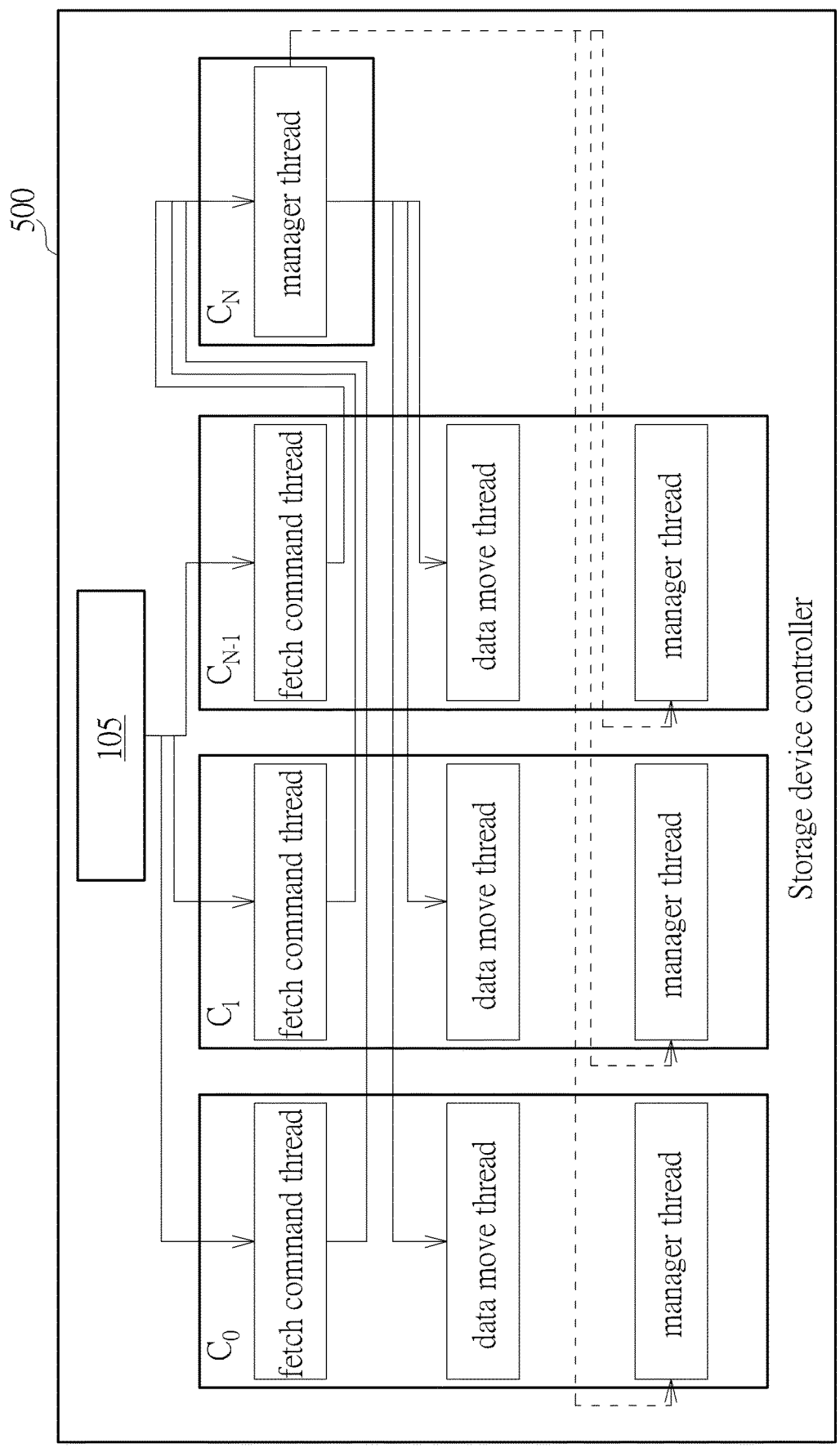
FIG. 5 is a block diagram of a storage device controller according to another embodiment of the invention.

FIG. 5 is a block diagram of a storage device controller 500 according to another embodiment of the invention. The storage device controller 500 is a multi-core flash memory processor (but not limited) which at least comprises multiple processor cores $C_0$, $C_1$, ..., $C_{N-1}$, and $C_N$, and a specific interface circuit 105 such as an NVM Express (NVMe) hardware circuit wherein the NVMe hardware circuit 105 supports NVMe protocol communication between the host device 101 (not shown in FIG. 5) and the storage device controller 500; the number N is not intended to be a limitation. The storage device controller 500 is externally coupled to the host device 101 such as a personal computer device or a server device and externally coupled to one or more storage devices such as flash memory-based SSDs (not shown in FIG. 1). A processor core such as $C_N$ among the multiple cores $C_0, C_1, \ldots, C_{N-1}$, and $C_N$ is selected as an administrator core (or referred to as a manager core) which has a manager thread TM such as a first host-based flash translation layer (abbreviated as HBFTL) thread and is arranged to execute the first HBFTL thread. The other processor cores $C_0, C_1, \ldots f\ C_{N-1}$ are regarded as worker cores, and each worker core has a first thread such as a fetch command thread TF and a second thread such as a data move thread TD. If a worker core is configured as a manager core for a specific open zone, the worker core further includes a second HBFTL thread which can be partially or fully copied and transmitted from the manager core $C_N$ into such worker core. The second HBFTL thread is assigned by the first HBFTL thread of the manager core $C_N$ to service or process data/operations of the specific open zone. Then, the first HBFTL thread running on the manager core $C_N$ is arranged to notify all the other worker cores of such worker core has been configured as a manager core of the specific open zone.

For example (but not limited), in FIG. 5, the manager core $C_N$ may assign the worker core $C_0$ as a manager core of the open zone X and transmit a copy of the first HBFTL thread to the worker core $C_0$ as the second HBFTL thread for the open zone X, assign the worker core $C_1$ as a manager core of the open zone Y and transmit a copy of the first HBFTL thread to the worker core $C_1$ as the second HBFTL thread for the open zone Y, and assign the worker core $C_{N-1}$ as a manager core of the open zone Z and transmit a copy of the first HBFTL thread to the worker core $C_{N-1}$ as the second HBFTL thread for the open zone Z; the other different worker cores may not be assigned as manager cores, and a copy of the first HBFTL thread are not transmitted to the other different worker cores. The manager core $C_N$ is arranged to notify all processor cores of the information which worker core(s) is/are assigned as manager core(s) dedicated for the open zone(s).

In this example in FIG. 5 (but not limited), initially the processor core $C_0$ is an idle worker core and is not yet configured used as the manager core of the open zone X. The worker core $C_0$ may executes its fetch command thread TF to fetch the write address information of one write command signal from the NVMe hardware circuit 105 wherein the write address information indicates SLBA information in the open zone Y, and then it transmits the write address information to the manager thread TM (i.e. the first HBFTL thread) of the manager core $C_N$. The manager core $C_N$ accordingly determines or configures the processor core $C_0$ as the manager core dedicated for the open zone X, and then a copy of the first HBFTL thread is transmitted from the manager core $C_N$ to the processor core $C_0$ and is used as the second HBFTL thread of the processor core $C_0$. Similarly, based on the same operations, the manager core $C_N$ can respectively determine or configure the processor core $C_1$ as the manager core dedicated for the open zone Y and the processor core $C_{N-1}$ as the manager core dedicated for the open zone Z. A copy of the first HBFTL thread is respectively transmitted from the manager core $C_N$ to the processor core $C_1$ and to the processor core $C_{N-1}$.

Figure 6:
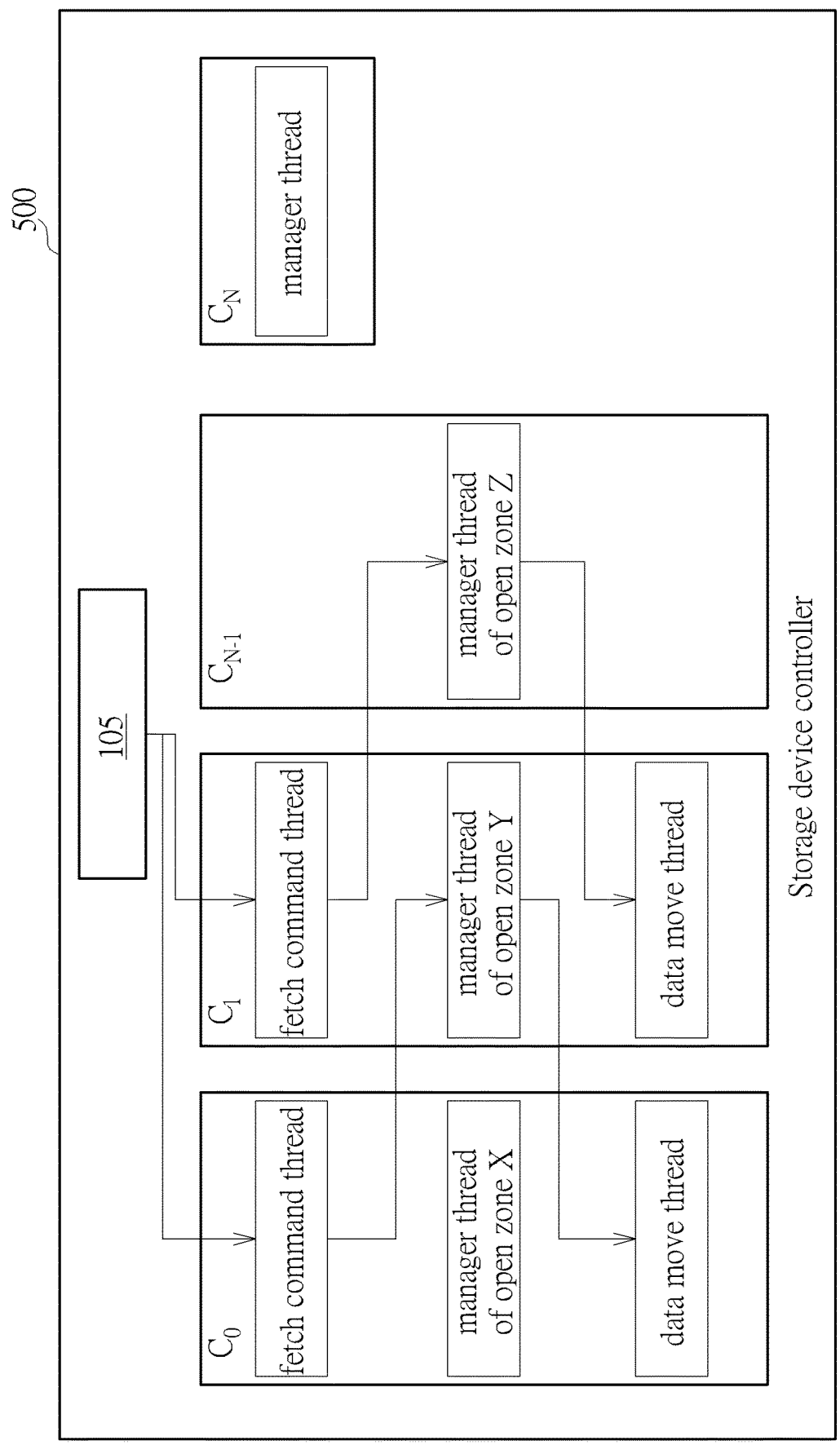
FIG. 6 is a diagram of a scenario example of the operations of the processor cores in the embodiment of FIG. 5 according to an embodiment of the invention.

FIG. 6 is a diagram of a scenario example of the operations of the processor cores in the embodiment of FIG. 5 according to an embodiment of the invention. In FIG. 6, the processor core $C_0$ has been configured as the manager core of the open zone X, and a copy of the manger thread in the manager core $C_N$ is transmitted to and stored in the processor core $C_0$. The processor core $C_1$ has been configured as the manager core of the open zone Y, and a copy of the manger thread in the manager core $C_N$ is transmitted to and stored in the processor core $C_1$. The processor core $C_{N-1}$ has been configured as the manager core of the open zone Z, and a copy of the manger thread in the manager core $C_N$ is transmitted to and stored in the processor core $C_{N-1}$.

In this example, for example (but not limited), the processor core $C_0$ executes its fetch command thread TF to fetch the SLBA and NLBA information of a write command signal associated with the open zone Y, and it is arranged to transmit the SLBA and NLBA information of the write command signal into the HBFTL thread of the processor core $C_1$ without transmit the SLBA and NLBA information to the manager core $C_N$. Then the processor core $C_1$, which is used as the manager core of the open zone Y, is arranged to generate or update a corresponding link list of the open zone Y, and then it transmits the SLBA and NLBA information of the write command signal for the open zone Y back to the data move thread TD of the processor core $C_0$, which is arranged to execute its data move thread TD to perform a data writing operation to load and write data of the write command signal for the open zone Y into a corresponding storage space belonging to the open zone Y.

Alternatively, the processor core $C_1$ executes its fetch command thread TF to fetch the SLBA and NLBA information of another write command signal associated with the open zone Z, and it is arranged to transmit the SLBA and NLBA information of the write command signal into the HBFTL thread of the processor core $C_{N-1}$ without transmit the SLBA and NLBA information to the manager core $C_N$. Then the processor core $C_{N-1}$, which is used as the manager core dedicated for the open zone Z, is arranged to generate or update a corresponding link list of the open zone Z, and then it transmits the SLBA and NLBA information of the write command signal to the data move thread TD of the processor core $C_1$, which executes its data move thread TD to load and write data of the write command into a corresponding storage space belonging to the open zone Z.

By doing so, in this example, the manager thread TM in the manager core $C_N$ is not triggered and executed to update link lists of open zones Y and Z. The loading of processor core $C_N$ can be alleviated.

Figure 7:
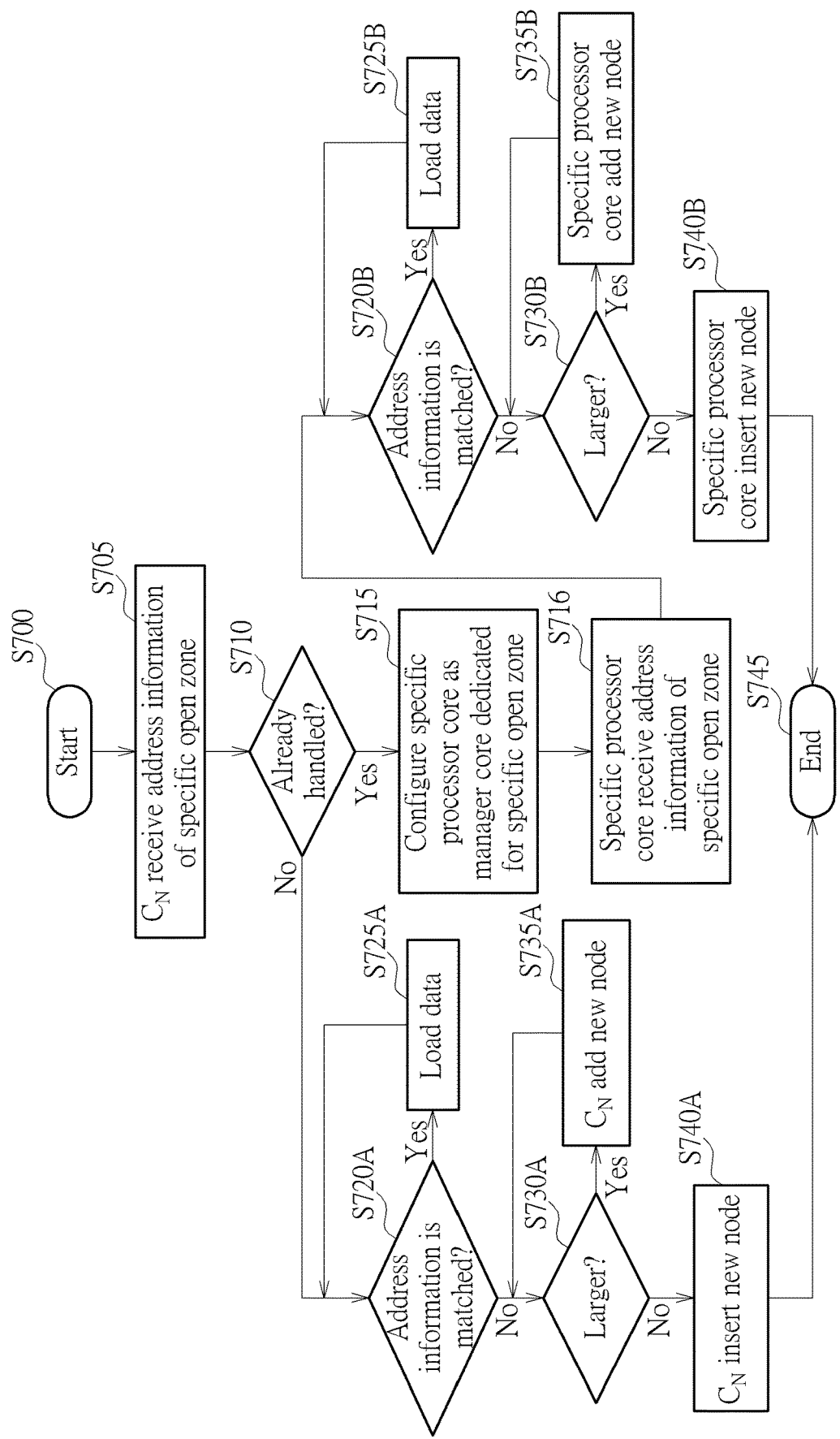
FIG. 7 is a flowchart diagram of the operations of the storage device controller executing the HBFTL thread of the manager core $C_N$ according to another embodiment of the invention.

FIG. 7 is a flowchart diagram of the operations of the storage device controller 500 executing the HBFTL thread of the manager core $C_N$ according to another embodiment of the invention. Provided that substantially the same result is achieved, the steps of the flowchart shown in FIG. 7 need not be in the exact order shown and need not be contiguous, that is, other steps can be intermediate. Steps are detailed in the following:

Step S700: Start;

Step S705: HBFTL thread of the manager core $C_N$ receives the information of SLBA and NLBA of a write command signal associated with a specific open zone;

Step S710: HBFTL thread of the manager core $C_N$ determines whether a specific processor core among the other processor core(s) $C_0$-$C_{N-1}$ has already handled a command of the specific open zone; if a processor has already handled the specific open zone, the flow proceeds Step S715, otherwise, the flow proceeds Step S720A;

Step S715: HBFTL thread of the manager core $C_N$ assigns or configures the specific processor core as a manager core dedicated for the specific open zone, creates and transmits a copy of the HBFTL thread of the manager core $C_N$ into the specific processor core, and notifies all the other different processor cores of the specific processor core being set as the manager core of the specific open zone;

Step S716: HBFTL thread of the specific processor core, different from the manager core $C_N$, receives the information of SLBA and NLBA of the write command signal associated with the specific open zone;

Step S720A: HBFTL thread of the manager core $C_N$ compares the information of the SLBA and NLBA of the write command signal with the information of a zone write pointer of the specific open zone to determine whether to execute a DMA operation; if the information is matched or equal, the flow proceeds Step S725A, otherwise, the flow proceeds Step S730A;

Step S725A: a direct memory access (DMA) operation is triggered and executed to load data;

Step S730A: HBFTL thread of the manager core $C_N$ compares the SLBA of the write command signal with the SLBA information at the last node of the link list; if the SLBA of the write command signal is larger than the SLBA information at the last node of the link list, the flow proceeds Step S735A, otherwise, the flow proceeds Step S740A;

Step S735A: HBFTL thread of the manager core $C_N$ adds a new node as a last node of the link list to record the address information of the received write command signal at the new node (i.e. the last node of the updated link list);

Step S740A: HBFTL thread of the manager core $C_N$ inserts a new node between two nodes of the link list to update the link list to record the address information of the received write command signal at the inserted node (i.e. it is not the last node of the updated link list);

Step S720B: HBFTL thread of the specific processor core compares the information of the SLBA and NLBA of the write command signal with the information of a zone write pointer of the specific open zone to determine whether to execute a DMA operation; if the information is matched or equal, the flow proceeds Step S725B, otherwise, the flow proceeds Step S730B;

Step S725B: a direct memory access (DMA) operation is triggered and executed to load data;

Step S730B: HBFTL thread of the specific processor core compares the SLBA of the write command signal with the SLBA information at the last node of the link list; if the SLBA of the write command signal is larger than the SLBA information at the last node of the link list, the flow proceeds Step S735B, otherwise, the flow proceeds Step S740B;

Step S735B: HBFTL thread of the specific processor core adds a new node as a last node of the link list to record the address information of the received write command signal at the new node (i.e. the last node of the updated link list);

Step S740B: HBFTL thread of the specific processor core inserts a new node between two nodes of the link list to update the link list to record the address information of the received write command signal at the inserted node (i.e. it is not the last node of the updated link list); and Step S745: End.

Figure 8:
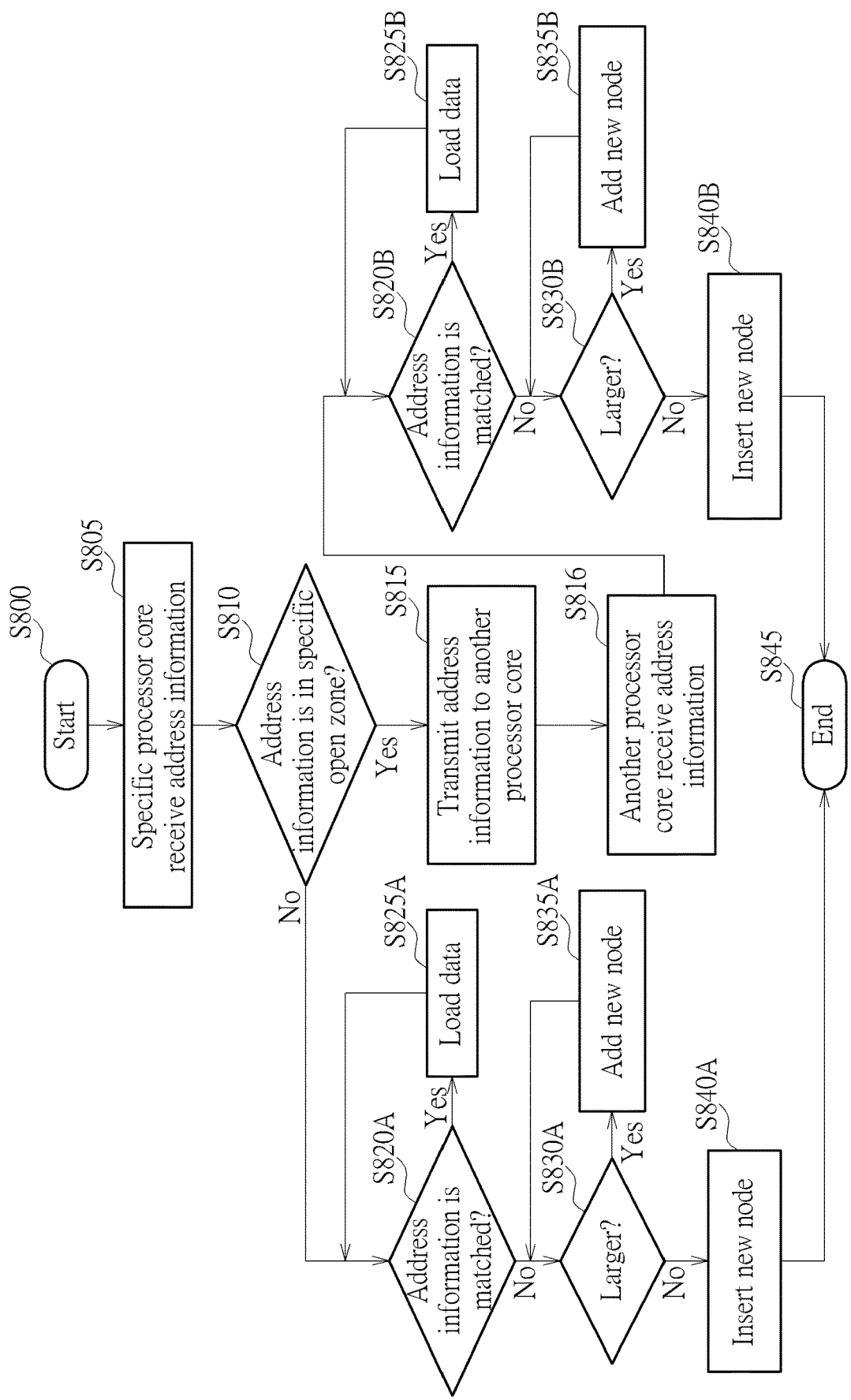
FIG. 8 is a flowchart diagram of the operations of the specific processor core in the embodiment of FIG. 7 according to another different embodiment of the invention.

FIG. 8 is a flowchart diagram of the operations of the specific processor core in the embodiment of FIG. 7 according to another different embodiment of the invention. Provided that substantially the same result is achieved, the steps of the flowchart shown in FIG. 8 need not be in the exact order shown and need not be contiguous, that is, other steps can be intermediate. Steps are detailed in the following:

Step S800: Start;

Step S805: HBFTL thread of the specific processor core, which has been configured as a manager core dedicated for a specific open zone, receives the information of SLBA and NLBA of a write command signal;

Step S810: HBFTL thread of the specific processor core determines whether the SLBA of the write command signal is in the specific open zone; if the SLBA of the write command signal is in the specific open zone, the flow proceeds Step S820A, otherwise, the flow proceeds Step S815;

Step S815: HBFTL thread of the specific processor core transmits the SLBA and NLBA information of the write command signal into another processor core which is assigned as a manager core of an open zone in which the SLBA of the write command signal is located;

Step S816: HBFTL thread of the another processor core, different from the specific processor core and manager core $C_N$, receives the information of SLBA and NLBA of the write command signal;

Step S820A: HBFTL thread of the specific processor core compares the information of the SLBA and NLBA of the write command signal with the information of a zone write pointer of the specific open zone to determine whether to execute a DMA operation; if the information is matched or equal, the flow proceeds Step S825A, otherwise, the flow proceeds Step S830A;

Step S825A: a direct memory access (DMA) operation is triggered and executed to load data;

Step S830A: HBFTL thread of the specific processor core compares the SLBA of the write command signal with the SLBA information at the last node of the link list; if the SLBA of the write command signal is larger than the SLBA information at the last node of the link list, the flow proceeds Step S835A, otherwise, the flow proceeds Step S840A;

Step S835A: HBFTL thread of the specific processor core adds a new node as a last node of the link list to record the address information of the received write command signal at the new node (i.e. the last node of the updated link list);

Step S840A: HBFTL thread of the specific processor core inserts a new node between two nodes of the link list to update the link list to record the address information of the received write command signal at the inserted node (i.e. it is not the last node of the updated link list);

Step S820B: HBFTL thread of the another processor core compares the information of the SLBA and NLBA of the write command signal with the information of a zone write pointer of another open zone to determine whether to execute a DMA operation; if the information is matched or equal, the flow proceeds Step S825B, otherwise, the flow proceeds Step S830B;

Step S825B: a direct memory access (DMA) operation is triggered and executed to load data;

Step S830B: HBFTL thread of the another processor core compares the SLBA of the write command signal with the SLBA information at the last node of the link list; if the SLBA of the write command signal is larger than the SLBA information at the last node of the link list, the flow proceeds Step S835B, otherwise, the flow proceeds Step S840B;

Step S835B: HBFTL thread of the another processor core adds a new node as a last node of the link list to record the address information of the received write command signal at the new node (i.e. the last node of the updated link list);

Step S840B: HBFTL thread of the another processor core inserts a new node between two nodes of the link list to update the link list to record the address information of the received write command signal at the inserted node (i.e. it is not the last node of the updated link list); and Step S845: End.

In other embodiments, for the different open zones, multiple idle processor cores may simultaneously execute their data move thread to load and move data units into different storage spaces specified by different write command signals respectively belonging to the different open zones.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A storage device controller, comprising:
an interface circuit, coupled to a host device externally coupled to the storage device controller, for receiving and storing different write address information of different write command signals sent from the host device, the different write address information being out of sequence; and
multiple processor cores, coupled to the interface circuit, a manager core of the multiple processor cores being used for rearranging an order of the different write command signals in sequence based on the different write address information and then writing data into at least one storage zone according to the rearranged different write command signals;
wherein the multiple processor cores comprise:
a first processor core, capable of being used as the manager core for all storage zones; and
at least one second processor core each capable of being used as a worker core;
wherein the first processor core controls the at least one second processor core writing data into the at least one storage zone according to the different write address information rearranged in sequence; and, the first processor core executes a manager thread to rearrange the order of the different write command signals based on the different write address information and controls the at least one second processor core writing corresponding data units into corresponding storage spaces of at least one storage zone according to the rearranged different write command signals.

2. The storage device controller of claim 1, wherein the worker core has a first thread and a second thread; the worker core executes the first thread to fetch a first write address information of a first write command signal from the interface circuit and transmit the write address information into the manager thread; and, the worker core executes the second thread to perform a data writing operation in response to a second write address information sent from the manager thread of the first processor core.

3. The storage device controller of claim 2, wherein the first write address information is different from the second write address information which is associated with a different write command signal.

4. The storage device controller of claim 1, wherein the first processor core further assigns a specific second processor core as a specific manager core dedicated for a specific storage zone in response to that the specific second processor core has handled a command associated with the specific storage zone, and then the first processor core transmits a copy of the manager thread into the specific second processor core which is used to execute the copy of the manager thread to rearrange an order of incoming write command signals of the specific storage zone.

5. The storage device controller of claim 4, wherein different write address information of the incoming write command signals of the specific storage zone are transmitted into the specific second processor core and are not transmitted to the manager thread of the first processor core.

6. The storage device controller of claim 4, wherein the first processor core is used to notify all the other processor cores of the specific second processor core being assigned as the manager core dedicated for the specific storage zone.

7. The storage device controller of claim 6, wherein the specific second processor core is used to transmit a write address information of another write command signal of another different storage zone into another processor core which is determined as another manager core dedicated for the another different storage zone, and does not rearrange write command signals in response to the write address information of the another write command signal of the another different storage zone.

8. The storage device controller of claim 6, wherein the specific second processor core has a first thread and a second thread; the specific second processor core executes the first thread to fetch a first write address information of a first write command signal of a first storage zone from the interface circuit and transmits the first write address information into another processor core dedicated for the first storage zone; and, the specific second processor core executes the second thread to perform a data writing operation in response to a second write address information sent from the first processor core; the first write address information and the second write address information are associated with the specific storage zone.

9. A method of a storage device controller, comprising:
using an interface circuit for receiving and storing different write address information of different write command signals sent from a host device, the different write address information being out of sequence; and
using a manager core of multiple processor cores to rearrange an order of the different write command signals in sequence based on the different write address information and then write data into at least one storage zone according to the rearranged different write command signals;
wherein the multiple processor cores comprise:
a first processor core, capable of being used as the manager core for all storage zones; and
at least one second processor core each capable of being used as a worker core; and
the method further comprises:
using the first processor core to control the at least one second processor core writing data into the at least one storage zone according to the different write address information rearranged in sequence; and
using the first processor core to execute a manager thread to rearrange the order of the different write command signals based on the different write address information and to control the at least one second processor core writing corresponding data units into corresponding storage spaces of at least one storage zone according to the rearranged different write command signals.

10. The method of claim 9, wherein the worker core has a first thread and a second thread; and the method further comprises:
using the worker core to execute the first thread to fetch a first write address information of a first write command signal from the interface circuit and to transmit the write address information into the manager thread; and
using the worker core to execute the second thread to perform a data writing operation in response to a second write address information sent from the manager thread of the first processor core.

11. The method of claim 10, wherein the first write address information is different from the second write address information which is associated with a different write command signal.

12. The method of claim 9, further comprising:
using the first processor core to further assign a specific second processor core as a specific manager core dedicated for a specific storage zone in response to that the specific second processor core has handled a command associated with the specific storage zone; and
using the first processor core to transmit a copy of the manager thread into the specific second processor core which is used to execute the copy of the manager thread to rearrange an order of incoming write command signals of the specific storage zone.

13. The method of claim 12, wherein different write address information of the incoming write command signals of the specific storage zone are transmitted into the specific second processor core and are not transmitted to the manager thread of the first processor core.

14. The method of claim 12, further comprising:
using the first processor core to notify all the other processor cores of the specific second processor core being assigned as the manager core dedicated for the specific storage zone.

15. The method of claim 14, further comprising:
using the specific second processor core to transmit a write address information of another write command signal of another different storage zone into another processor core which is determined as another manager core dedicated for the another different storage zone, and not to rearrange write command signals in response to the write address information of the another write command signal of the another different storage zone.

16. The method of claim 14, wherein the specific second processor core has a first thread and a second thread; and the method further comprises:
using the specific second processor core to execute the first thread to fetch a first write address information of a first write command signal of a first storage zone from the interface circuit and to transmit the first write address information into another processor core dedicated for the first storage zone; and
using the specific second processor core to execute the second thread to perform a data writing operation in response to a second write address information sent from the first processor core;
wherein the first write address information and the second write address information are associated with the specific storage zone.

* * * * *